(12) United States Patent
Buchheit

(10) Patent No.: US 9,046,920 B1
(45) Date of Patent: Jun. 2, 2015

(54) ROTATING AN N-SIDED OBJECT TO NAVIGATE ITEMS OF AN ORDERED DATA SET

(76) Inventor: Brian K. Buchheit, Davie, FL (US)

( * ) Notice: Subject to any disclaimer, the term of this patent is extended or adjusted under 35 U.S.C. 154(b) by 414 days.

(21) Appl. No.: 13/568,304

(22) Filed: Aug. 7, 2012

Related U.S. Application Data

(63) Continuation-in-part of application No. 11/468,180, filed on Aug. 29, 2006, now Pat. No. 8,259,132.

(51) Int. Cl.
*G09G 5/00* (2006.01)
*G06F 3/01* (2006.01)
*G06F 3/038* (2013.01)

(52) U.S. Cl.
CPC .............. *G06F 3/011* (2013.01); *G06F 3/038* (2013.01)

(58) Field of Classification Search
None
See application file for complete search history.

(56) References Cited

U.S. PATENT DOCUMENTS

| 6,529,184 | B1 * | 3/2003 | Julienne | 345/157 |
| 2004/0001075 | A1 * | 1/2004 | Balakrishnan et al. | 345/653 |
| 2007/0247439 | A1 * | 10/2007 | Daniel et al. | 345/173 |
| 2012/0249412 | A1 * | 10/2012 | Kurata | 345/156 |

* cited by examiner

*Primary Examiner* — Edward Martello
(74) *Attorney, Agent, or Firm* — Patents on Demand P.A.; Brian K. Buchheit; Scott M. Garrett

(57) ABSTRACT

An initial face of an object having N faces along an axis of rotation is detected. A data set of ordered content items is assessed. An initial one of the ordered content items is visually presented within a field of a user interface shown on a display. The field of the user interface is a displayed graphical element of the user interface distinct from the object. The object being rotated along the axis of rotation is detected so that X number of faces are cycled as the object is rotated from the initial face to a post-rotation face of the N faces. The data set is sequentially advanced by X number of items from the initial one of the content items to a current item of the content items. The field of the user interface is updated to visually present the current content item.

21 Claims, 11 Drawing Sheets

375

Physical Analog
Input Device
310

User 305

ROTATING AN N-SIDED OBJECT TO NAVIGATE ITEMS OF AN ORDERED DATA SET

CROSS-REFERENCE TO RELATED APPLICATIONS

This continuation-in-part application claims the benefit of U.S. patent application Ser. No. 11/468,180, now U.S. Pat. No. 8,249,132, filed 29 Aug. 2006 entitled "ROTATIONALLY DEPENDENT INFORMATION IN A THREE DIMENSIONAL GRAPHICAL USER INTERFACE. The entire contents of U.S. application Ser. No. 11/468,180 (U.S. Pat. No. 8,249,132) are incorporated by reference herein.

BACKGROUND

The present invention relates to the field of information data set navigation and rotational objects.

The presentation of information is a crucial component of business that is often underappreciated. Most software applications present information visually, sometimes supplemented with or alternatively presented as an audio presentation. A variety of graphical user interface (GUI) tools and input devices have been developed to present information and allow a user to manipulate the presentation. For example, conventional interface tools include hot-keys, menus, toolbars, pop-up command lists, mouse clicks, and the like; conventional input devices include a mouse, a keypad, a keyboard, a remote control device, touch screens, and the like. Together, these components facilitate user interaction with the information in an electronic space. However, the majority of existing software tools are limited to navigating a dataset in a logically-linear manner using a conventional input mechanism.

That is, the GUI elements of conventional software tools act in a way that is consistent with a physical reality and a linear logic. For example, selecting the forward-facing or "next" button in a GUI for a digital book displays the next page, which follows a linear numeric sequence. In essence, conventional software tools mimic the user interactions that are performed with a corresponding physical object (i.e., opening the book, closing the book, and turning pages).

While such software tools are sufficient for repeating manual manipulations within an electronic space, they do not fully utilize and interconnect the vast amount of information available. The amount of information contained in a physical book is limited by the number of pages it contains and each page displays two sets of information, one on each side. Additionally, a book typically has a variety of related information (e.g., book reviews, author's notes, essays, etc.) written about it contained in other sources (e.g., literary journals, magazines, newspapers, etc.).

In the electronic space of the GUI taught in U.S. Pat. No. 8,249,132 titled "ROTATIONALLY DEPENDENT INFORMATION IN A THREE DIMENSIONAL GRAPHICAL USER INTERFACE", a digital representation is able to disregard the limitations of its physical counterpart. For example, pages containing author's notes could be dynamically added to the content of a book, exceeding the number of pages in its physical counterpart. Further, three-dimensional rotation of the digital representation of the book can be used to present related information acquired from other sources, which is impossible with a physical book. For example, rotating the front cover of the book towards the user (i.e., perpendicular to the book's spine) could present the user with book review information instead of the expected edge-view of the book's pages

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

Figure 1:
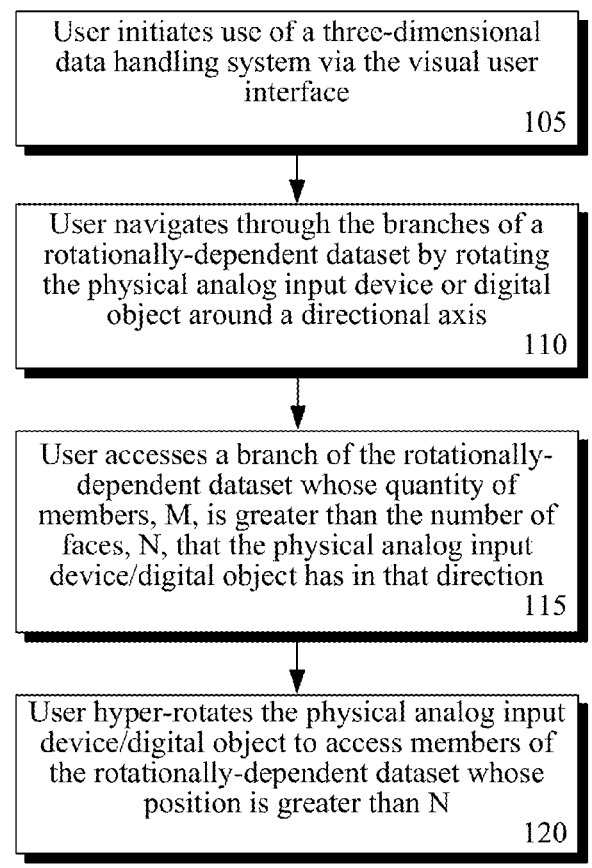
FIG. 1 is a flowchart of a method describing the use of a three-dimensional data handling system to navigate a rotationally-dependent dataset in accordance with embodiments of the inventive arrangements disclosed herein.

The present invention discloses a solution for controlling navigation through a rotationally-dependent dataset within a graphical user interface of a three-dimensional data handling system by manipulating a physical analog input device. The physical analog input device can be manipulated along its directional axes to control navigation through the data elements of a rotationally-dependent dataset. The rotationally-dependent dataset can be a multi-dimensional relational data structure. When the quantity of data elements of a branch of the rotationally-dependent dataset is greater than the number of faces the physical analog input device has along the directional axis, the physical analog input device can be hyper-rotated to continue navigation within the graphical user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of a method 100 describing the use of a three-dimensional data handling system to navigate a rotationally-dependent dataset in accordance with embodiments of the inventive arrangements disclosed herein. The three-dimensional data handling system can represent one of the many possible embodiments described within U.S. Pat. No. 8,249,132 titled "ROTATIONALLY DEPENDENT INFORMATION IN A THREE DIMENSIONAL GRAPHICAL USER INTERFACE".

Method 100 can begin in step 105 where the user can initiate use of the three-dimensional data handling system via the visual user interface. The user can navigate through the branches of a rotationally-dependent dataset by rotating a physical analog input device or a digital object around a rotational axis in step 110.

In step 115, the user can access a branch of the rotationally-dependent dataset whose quantity of members, M, is greater than the number of faces, N, that the physical analog input device or digital object has in that direction. For example, a cube physical analog input device or digital object can have three rotational axes (x, y, and z) and four distinct or unrepeated faces in each rotational direction (N=4). Step 115 can be applicable to any branch of the rotationally-dependent dataset having more than four data elements.

To access members of the rotationally-dependent dataset whose position is greater than N, the user can hyper-rotate (i.e., continue rotation past a full revolution) the physical analog input device or digital object, in step 120. Essentially, the faces of the physical analog input device/digital object can be reused to represent the additional data elements; a one-to-one relationship need not exist between each face of the physical analog input device/digital object and a member of the rotationally-dependent dataset.

Figure 2:
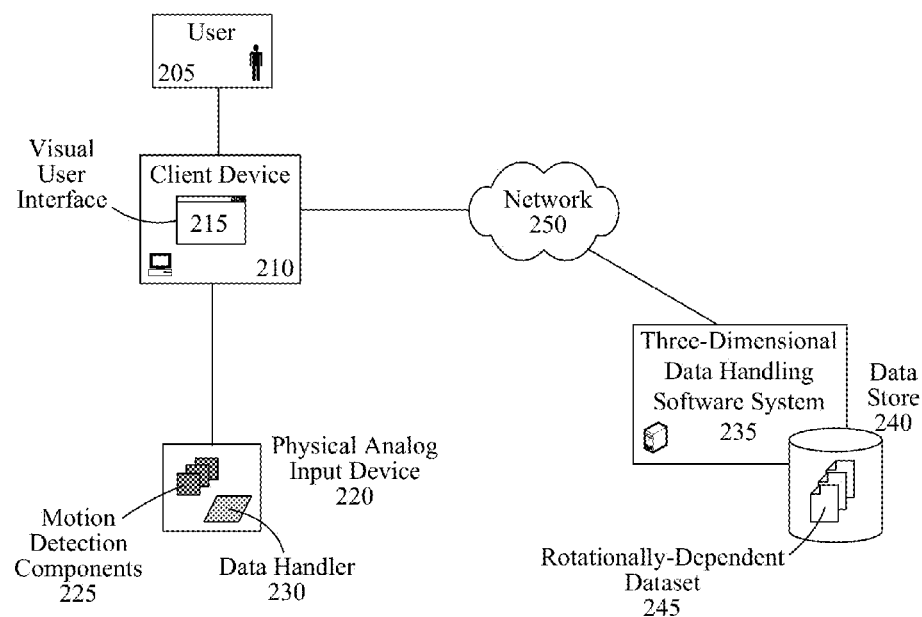
FIG. 2 is a schematic diagram of a system for utilizing a three-dimensional data handling system in accordance with an embodiment of the inventive arrangements disclosed herein.

FIG. 2 is a schematic diagram of a system 200 for utilizing a three-dimensional data handling system 235 in accordance with an embodiment of the inventive arrangements disclosed herein. System 200 can be utilized for the performance of method 100.

In system 200, the user 205 can interact with a three-dimensional data handling system 235 via a visual user interface 215. As used herein, the terms "visual user interface" and "graphical user interface" can be used interchangeably to refer to user interface of the three-dimensional data handling system 235 and/or a software application being presented to the user 205 whose operation is supported by the three-dimensional data handling system 235. The three-dimensional data handling system 235, including the visual user interface 215, can be a specific embodiment of the three-dimensional graphical user interface (GUI) described in U.S. Pat. No. 8,249,132 titled "ROTATIONALLY DEPENDENT INFORMATION IN A THREE DIMENSIONAL GRAPHICAL USER INTERFACE".

As such, the three-dimensional data handling system 235 can represent the hardware and/or software required to support the presentation of a rotationally-dependent dataset 245 with the visual user interface 215. The architecture (e.g., client/server, Web 2.0, etc.) and/or configuration (e.g., distributed, centralized, etc.) of the three-dimensional data handling system 235 can vary based upon the requirements for the specific embodiment.

The rotationally-dependent dataset 245 can be a collection of data elements and/or data groups arranged according to a predetermined relational model and/or hierarchical structure where the presentation of different branches of the relational model is dependent upon the rotation of a digital object within the visual user interface 215. In essence, a rotationally-dependent dataset 245 can be similar to a typical relational set of data with the exception of having defined three-dimensional parameters for presentation.

Take, for example, data arranged in a typical hierarchical tree structure like folders having sub-folders that contain files. To make such a tree structure a rotationally-dependent dataset 245 can require defining three-dimensional presentation parameters that relate the data's presentation to the rotational path of a digital object in the user interface 215 that represents the rotationally-dependent dataset 245.

In another contemplated embodiment, the three-dimensional data handling system 235 can interpret the three-dimensional presentation parameters from the relationships expressed in the rotationally-dependent dataset 245.

The rotationally-dependent datasets 245 can be stored in a data store 240 of the three-dimensional data handling system 235. In another embodiment, the rotationally-dependent dataset 245 can be stored remote from, but accessible by the three-dimensional data handling system 235, such as in a data store of the client device 210.

In yet another contemplated embodiment, the rotationally-dependent dataset 245 can be dynamically aggregated by the three-dimensional data handling system 235 from various accessible data sources (not shown) when the rotationally-dependent dataset 245 is selected by the user 205.

The visual user interface 215 can be a graphical means in which the user 205 can access the functionality of the three-dimensional data handling system 235, as described in U.S. Pat. No. 8,249,132 titled "ROTATIONALLY DEPENDENT INFORMATION IN A THREE DIMENSIONAL GRAPHICAL USER INTERFACE" and further detailed herein. The visual user interface 215 can run on a client device 210. The client device 210 can represent a variety of computing devices capable of supporting operation of the visual user interface 215 and communicating with the three-dimensional data handling system 235 over the network 250.

The client device 210 shown in system 200 can utilize a physical analog input device 220, in addition to or in lieu of one or more conventional input mechanisms (e.g., keyboard, mouse, etc.). The physical analog input device 220 can represent a physical object that is able to be rotated around predefined rotational axes, providing the rotational data as input data for the three-dimensional data handling system 235.

The physical analog input device 220 can include one or more motion detection components 225 and a data handler 230. A motion detection component 225 can be configured to determine when the physical analog input device 220 is moved in a specified direction. Since the three-dimensional data handling system 235 is concerned with how the physical analog input device 220 is rotated, the motion detection components 225 can be aligned such as to indicate when the physical analog input device 220 is rotated around a rotational axis. The data handler 230 can be the component that collects and communicates the input data to the client device 210 using a physical (e.g., cable) or wireless connection.

It should be noted that the three-dimensional geometry of the physical analog input device 220 can affect the quantity of rotational axes, the number of distinct faces along each axis, and the navigation behavior of the three-dimensional data handling system 235. For example, a regular quadrilateral-faced physical analog input device 220 like a cube can have three rotation axes and four distinct faces along each axis; a regular dodecahedron physical analog input device 220 (e.g., a 12-sided die comprised of regular pentagonal faces) can have upwards of six rotational axes with a variable number of faces along each axis. For the sake of simplicity, a cubic geometry is used in the following Figures.

Additionally, the physical analog input device 220 can include selectors (e.g., buttons or switches) that increase functionality of the physical analog input device 220, such as for changing the mode of the three-dimensional data handling system 235 as discussed in U.S. Pat. No. 8,249,132 titled "ROTATIONALLY DEPENDENT INFORMATION IN A THREE DIMENSIONAL GRAPHICAL USER INTERFACE".

Network 250 can include any hardware/software/and firmware necessary to convey data encoded within carrier waves. Data can be contained within analog or digital signals and conveyed though data or voice channels. Network 250 can include local components and data pathways necessary for communications to be exchanged among computing device components and between integrated device components and peripheral devices. Network 250 can also include network equipment, such as routers, data lines, hubs, and intermediary servers which together form a data network, such as the Internet. Network 250 can also include circuit-based communication components and mobile communication components, such as telephony switches, modems, cellular communication towers, and the like. Network 250 can include line based and/or wireless communication pathways.

As used herein, presented data store 240 can be a physical or virtual storage space configured to store digital information. Data store 240 can be physically implemented within any type of hardware including, but not limited to, a magnetic disk, an optical disk, a semiconductor memory, a digitally encoded plastic memory, a holographic memory, or any other recording medium. Data store 240 can be a stand-alone storage unit as well as a storage unit formed from a plurality of physical devices. Additionally, information can be stored within data store 240 in a variety of manners. For example, information can be stored within a database structure or can be stored within one or more files of a file storage system, where each file may or may not be indexed for information searching purposes. Further, data store 240 can utilize one or more encryption mechanisms to protect stored information from unauthorized access.

Figure 3A:
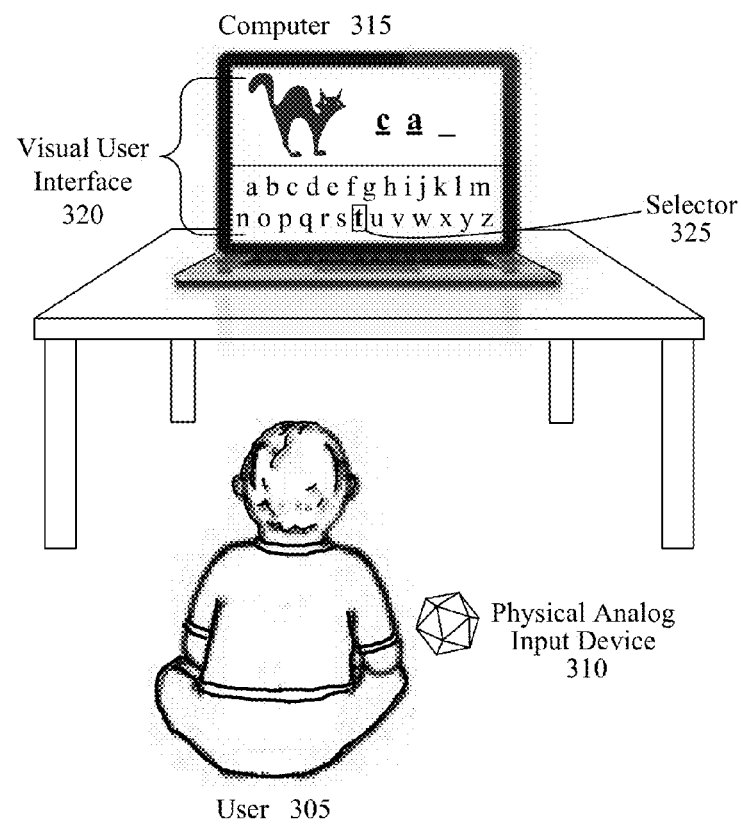
FIG. 3A is an example embodiment of a three-dimensional data handling system that utilizes rotation of a physical analog input device to control selections in a visual user interface in accordance with an embodiment of the inventive arrangements disclosed herein.

FIG. 3A is an example embodiment 300 of a three-dimensional data handling system that utilizes rotation of a physical analog input device 310 to control selections in a visual user interface 320 in accordance with an embodiment of the inventive arrangements disclosed herein. Embodiment 300 can be a specific implementation of system 200.

The example embodiment 300 can illustrate use of the three-dimensional data handling system as a learning tool. In this example, the user 305, a child, can use a computer 315 to interact with a learning software application that is supported by the three-dimensional data handling system. The visual user interface 320 can be that of the learning software application and can be presented to the user 305 within the display of the computer 315.

The computer 315 and visual user interface 320 can both be configured to accept input from the user 305 via the physical analog input device 310. In this example embodiment 300, the physical analog input device 310 can be an icosahedron (20-sided polyhedron) that wirelessly communicates with the computer 315. Movement of the physical analog input device 310 can result in a corresponding movement of the selector 325 within the visual user interface 320.

Use of the physical analog input device 310 in this embodiment 300 can have numerous benefits over conventional computing input devices. Firstly, many conventional computing input devices like a mouse and keyboard are designed as "one-size-fits-most". Not all users 305, particularly children, can comfortably and ergonomically use the same conventional computing input device.

For example, a child cannot easily manipulate a mouse or type effectively on a keyboard that were designed for an adult (e.g., fingers are too small to properly rest on keyboard keys, hand is too small to grip and move mouse, etc.). While child-sized computing input devices exist, they incur additional cost and require the adult user 305 to switch out devices or ineffectively use the child-size device, which then poses a similar and opposite problem for the adult user 305 (e.g., hand is too big to comfortably click mouse buttons, fingers hit too many keys on the keyboard, etc.).

Size need not be a problem for multiple users 305 when using the physical analog input device 310. Since the three-dimensional data handling system is concerned with rotational movement, not planar motion, the physical analog input device 310 can be of a size that is relatively easy for users 305 of varying hand size and motor skill proficiency to manipulate. That is, most users 305 can "roll" the icosahedron along the floor or other relatively flat surface.

Alternately, the physical analog input device 310 can be mounted in a specialized base or holder for stabilization and/or definition of the rotational axes. For example, a specialized base can limit physical analog input devices 310 of varying geometrical shapes to the X, Y, and Z axes. Such a base can also be beneficial for users 305 who difficulty manipulating conventional computing input devices due to illness and can help to reduce repetitive motion injuries like carpal tunnel syndrome caused by conventional computing input device use.

Figure 3B:
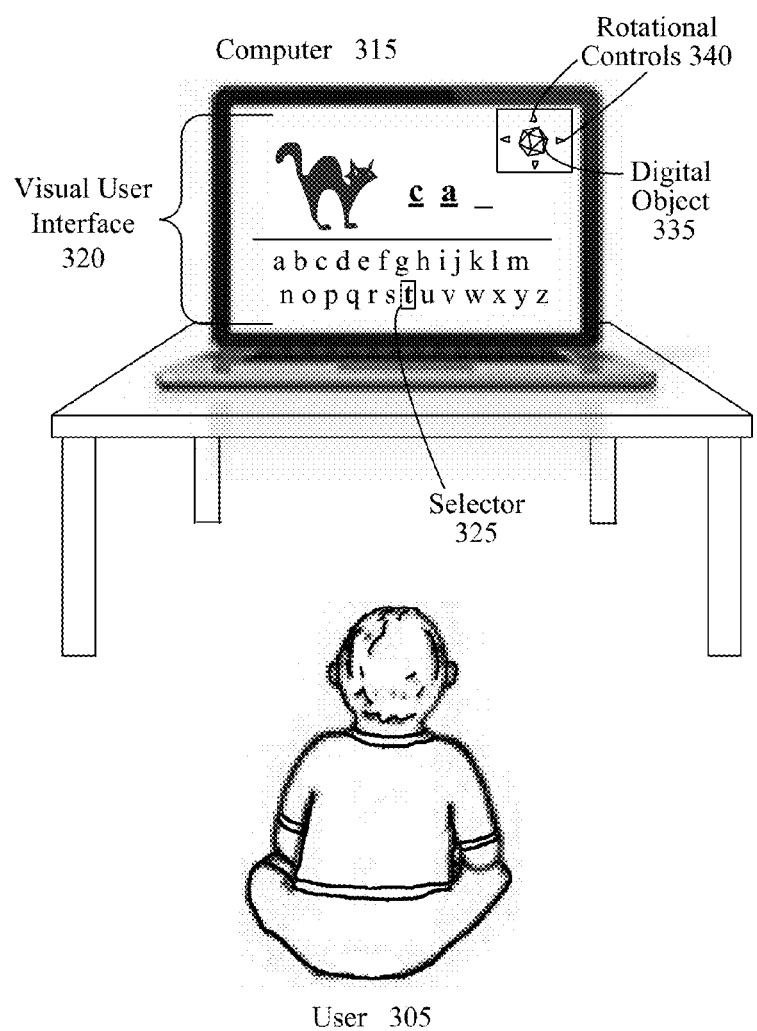
FIG. 3B is an example embodiment of a three-dimensional data handling system that utilizes rotation of a digital object to control the selector 325 in a visual user interface in accordance with an embodiment of the inventive arrangements disclosed herein.

FIG. 3B is an example embodiment 330 of a three-dimensional data handling system that utilizes rotation of a digital object 335 to control the selector 325 in a visual user interface 320 in accordance with an embodiment of the inventive arrangements disclosed herein. Embodiment 300 can be a specific implementation of system 200.

Example embodiment 330 can also illustrate use of the three-dimensional data handling system as a learning tool. Example embodiment 330 can be an alternate, but complementary embodiment of example embodiment 300 of FIG. 3A. In this example, the user 305, a child, can use a computer 315 to interact with a learning software application that is supported by the three-dimensional data handling system. The visual user interface 320 can be that of the learning software application and can be presented to the user 305 within the display of the computer 315.

In example embodiment 330, the user 305 can control movement of the selector 325 using the rotational controls 340 for a digital object 335; not with a physical analog input device 310 as in embodiment 300 of FIG. 3A. The digital object 335 can be a three-dimensional graphic of a fixed-sided object that is used as a control mechanism for the selector 325. As shown in the example embodiment 330, the digital object 335 can be a three-dimensional representation of an icosahedron.

The rotational controls 340 can be the elements (e.g., buttons, slider bars, etc.) of the visual user interface 320 that, when selected by the user 305, rotate the digital object 335 along a directional axis. The rotational controls 340 can be presented three-dimensionally in alignment with the directional axes or can be presented two-dimensionally, depending upon the specific implementation of the three-dimensional data handling system and/or software application.

Further, the rotational controls 340 can be hidden from the user 305. That is, the rotational controls 340 need not be overtly presented to the user 305 within the visual user interface 320. For example, a portion (e.g., edge or face) of the digital object 335 can be clicked upon and the entire digital object 335 rotated. In such an example, the rotational controls 340, rotating of the digital object 335, of the visual user interface 320 can be implicitly understood by the user 305 and need not have a visual representation.

The rotational controls 340 can be activated by the user 305 in a manner commensurate with the computer 315 and/or the underlying software application. For example, when using a computer 315 having a touch screen display, the rotational controls 340 can be activated by a touch selection (e.g., touch acts as would a mouse-click) or a touch-directed manipulation of the digital object 335 (e.g., touch and rotate the digital object 335 along a directional axis).

Figure 3C:
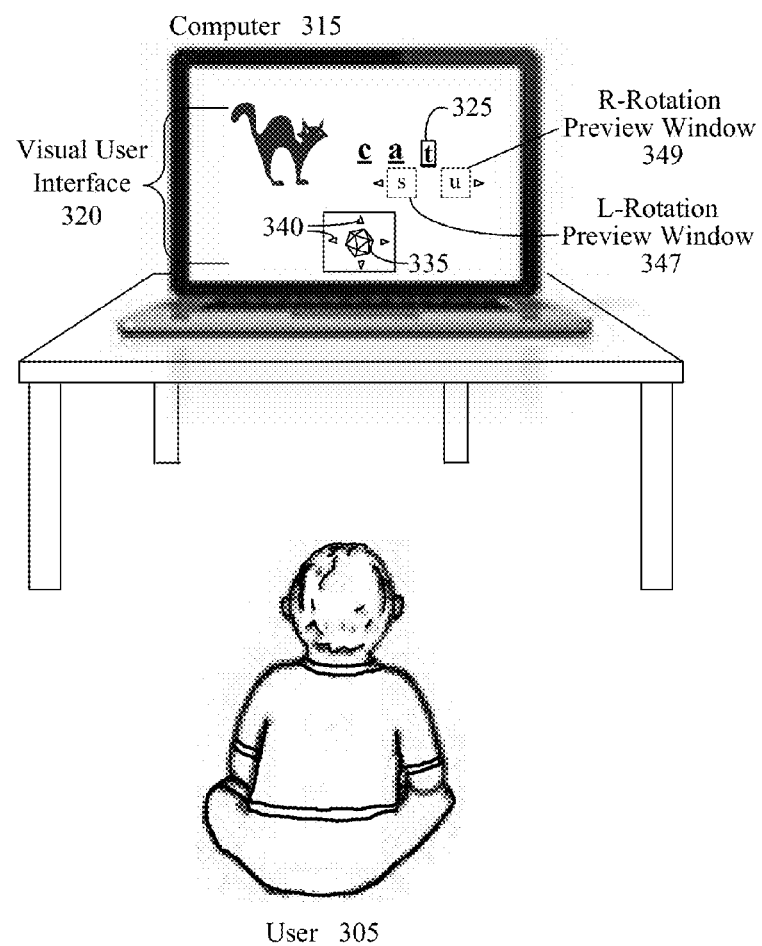
FIG. 3C is an example embodiment of a three-dimensional data handling system utilizing selection preview windows within a visual user interface to provide selection assistance for the rotation of a digital object in accordance with an embodiment of the inventive arrangements disclosed herein.

FIG. 3C is an example embodiment 345 of a three-dimensional data handling system utilizing selection preview windows 347 and 349 within a visual user interface 320 to provide selection assistance for the rotation of a digital object 335 in accordance with an embodiment of the inventive arrangements disclosed herein. Embodiment 345 can represent a specific implementation of system 200.

Example embodiment 345 can be an expansion upon embodiment 330 of FIG. 3B. In embodiment 345, preview windows 347 and 349 can appear within the visual user interface 320 to show the user 305 the data items to the right and left, respectively, of the data item that is currently highlighted or displayed within the selector 325 as related to the rotation of the digital object 335.

Unlike in embodiment 330, the visual user interface 320 of example embodiment 345 can exclude a listing of data items that the selector 325 scrolls through in response to the rotation of the digital object 335; displaying large lists of data items can obscure the visual user interface 320 and make it difficult to read the data items easily. The preview windows 347 and 349 can replace the listing of data items by limiting the data items presented to the user 305 to those data items that are within one rotational step of the data item currently displayed by the selector 325.

As shown in this example, the user 305 can be attempting to spell the word "cat". The selector 325 can be currently upon the letter 't'. The left-rotation preview window 347 can display the letter 's', indicating that a left rotation of the digital object 335 using the rotational controls 340, assuming a Cartesian set of axes, will move the selector 325 to the letter 's'. Likewise, a right rotation of the digital object 335 can result in the movement of the selector 325 to the letter 'u', as shown by the right-rotation preview window 349.

The left and right rotation preview windows 347 and 349 can be configured as such to appear when the selector 325 is in use like a typical pop-up window. Further, the visual user interface 320 can include additional rotation preview windows to display related, selectable data items of the rotationally-dependent dataset that correspond to the directional axes represented by the rotational controls 340.

Figure 3D:
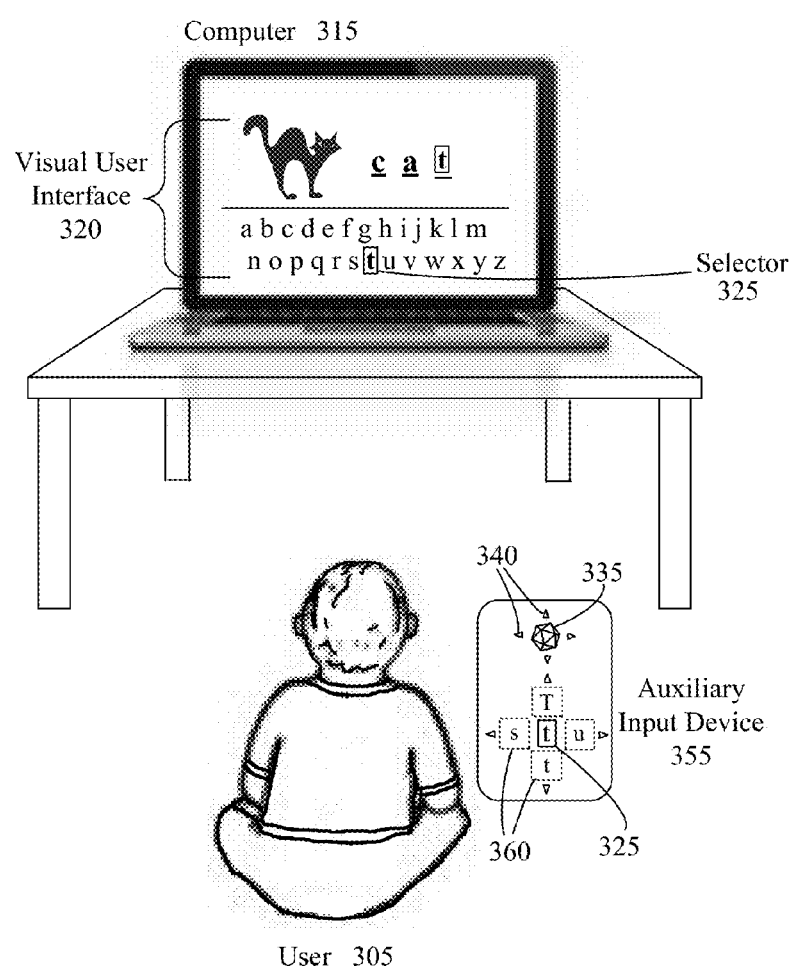
FIG. 3D is an example embodiment of a three-dimensional data handling system that utilizes an auxiliary input device that presents the digital object for controlling selections in a visual user interface in accordance with an embodiment of the inventive arrangements disclosed herein.

FIG. 3D is an example embodiment 350 of a three-dimensional data handling system that utilizes an auxiliary input device 355 that presents the digital object 335 for controlling selections in a visual user interface 320 in accordance with an embodiment of the inventive arrangements disclosed herein. Embodiment 350 can represent a specific implementation of system 200.

In example embodiment 350, the user 305 can control movement of the selector 325 within the visual user interface 320 by rotating the digital object 335 displayed upon an auxiliary input device 355. Like embodiments 330 and 345, the user 305 can use the rotational controls 340 to rotate the digital object 335, and, therefore, move the selector 325 to the desired data item.

However, in embodiment 350, the digital object 335 and rotational controls 340 can be presented to the user 305 upon an auxiliary input device 355, instead of within the visual user interface 320. The auxiliary input device 355 can represent a computing device configured to present the user 305 with the control elements for the visual user interface 320 and communicate entered commands to the computer 315.

Examples of an auxiliary input device 355 can include, but are not limited to, a tablet computer (e.g., iPad), a notebook computer, a smart phone, a portable multi-media device (e.g., iPod Touch), a remote control, a portable gaming console (e.g., PSP), and the like. The auxiliary input device 355 can be physically connected to the computer 315 via a cable or can include wireless communications components to wirelessly exchange data.

As shown in this example embodiment 350, the auxiliary input device 355 can present the user 305 with the digital object 335, rotational controls 340, and rotational preview windows 360 for the data item currently highlighted by the selector 325. Such a configuration can allow the user 305 to control interaction with the visual user interface 320 at a distance from the computer 315.

Figure 3E:
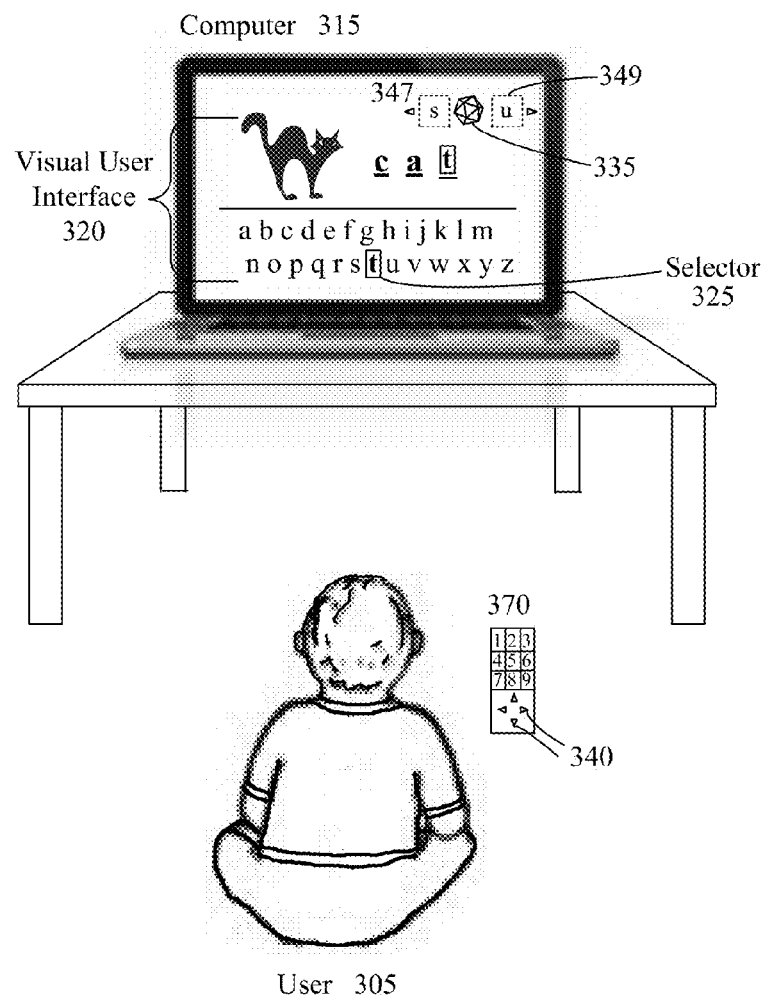
FIG. 3E is an example embodiment of a three-dimensional data handling system that utilizes a remote control to control rotation of a digital object in a visual user interface in accordance with an embodiment of the inventive arrangements disclosed herein.

FIG. 3E is an example embodiment 365 of a three-dimensional data handling system that utilizes a remote control 370 to control rotation of a digital object 335 in a visual user interface 320 in accordance with an embodiment of the inventive arrangements disclosed herein. Embodiment 365 can represent a specific implementation of system 200 and/or example embodiment 350.

In example embodiment 365, the user 305 can utilize a remote control 370 having rotational controls 340 to control selector 325 movement in the visual user interface 320. The remote control 370 can be a specialized auxiliary input device 355 of embodiment 350 of FIG. 3D. The rotational controls 340 of the remote control 370 can rotate the digital object 335, causing the selector 325 to move through the data items and changing the contents presented in the left and right rotational preview windows 347 and 349.

Figure 3F:
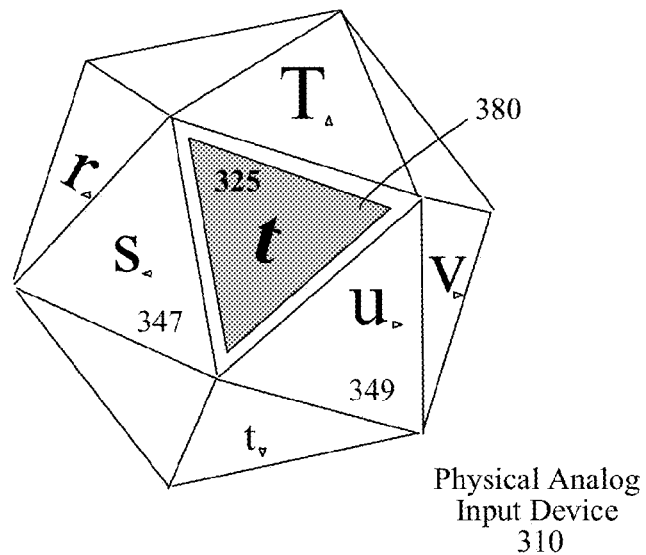
FIG. 3F is an example embodiment for a physical analog input device and the correspondence of physical side rotations to selections made in a visual user interface in accordance with an embodiment of the inventive arrangements disclosed herein.
Figure 3F:

FIG. 3F is an example embodiment 375 for a physical analog input device 310 and the correspondence of physical side rotations to selections made in a visual user interface 320 in accordance with an embodiment of the inventive arrangements disclosed herein. Embodiment 375 can be utilized within the context of system 200 and/or embodiments 300.

Physical analog input device 310 can be constructed such that its faces include a graphical display area 380 within which data items can be presented to the user 305, such as the data item currently selected 325 as well as those data items rotationally-related 347 and 349 to the current data item. The graphical display area 380 can be implemented utilizing a variety of display technologies such as electronic paper, electrophoretic display, electrofluidic display, light-emitting diode (LED) display, organic LED (O-LED) display, and the like.

The graphical display area 380 can be covered and protected by a clear, scratch-resistant material like GORILLA GLASS or DRAGONTRAIL. Such an exterior can serve to protect other sensitive components (e.g., motion sensors, computing elements, etc.) that can be positioned within the physical analog input device 310.

The data items presented within the graphical display area 380 of the physical analog input device 310 can change based upon the software application being run by the user 305. For example, different foreign language software applications can each present the corresponding alphabet within the graphical display areas 380 of the physical analog input device 310; a software application teaching mathematical skills can display numbers instead of letters.

Figure 3G:
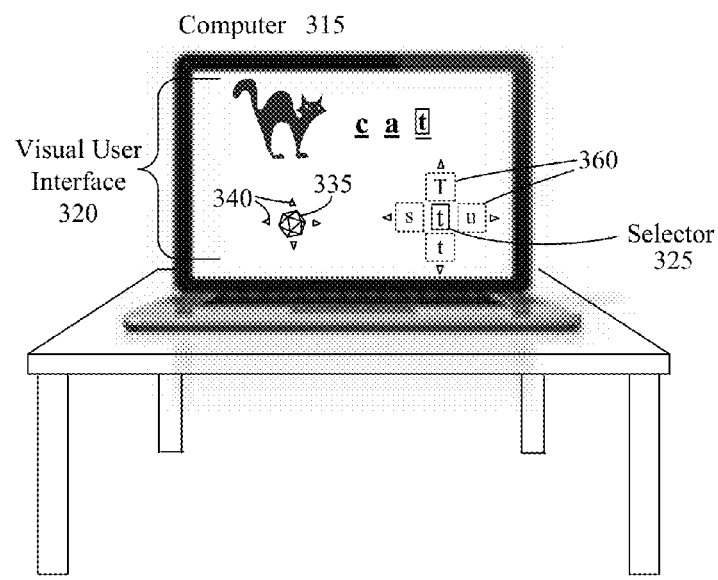
FIG. 3G is an example embodiment of a three-dimensional data handling system that utilizes a physical analog input device paired with a digital object to control selections in a visual user interface in accordance with an embodiment of the inventive arrangements disclosed herein.
Figure 3G:

FIG. 3G is an example embodiment 385 of a three-dimensional data handling system that utilizes a physical analog input device 310 paired with a digital object 335 to control selections in a visual user interface 320 in accordance with an embodiment of the inventive arrangements disclosed herein. Embodiment 385 can represent a specific implementation of system 200 and the physical analog input device 310 described in embodiment 375 of FIG. 3F.

Example embodiment 385 can represent a robust implementation of the three-dimensional data handling system in which the data items presented within the graphical display areas 380 of the physical analog input device 310 can be paired to or synchronized with the orientation of the digital object 335 and the data items displayed in the rotational preview windows 360. That is, the movement of the physical analog input device 310 can be mirrored by the digital object 335 and vice versa.

Therefore, when the user 305 rolls the physical analog input device 310 to the right, the digital object 335 can also be rotated to the right within the visual user interface 320 and the contents of the selector 325 and the rotational preview windows 360 can be updated to reflect the shift to the appropriate data item. Likewise, when the user 305 utilizes the rotational controls 340 within the visual user interface 320 to rotate the digital object 335 to the left, the contents of the graphical display areas 380 of the physical analog input device 310, the selector 325, and the rotational preview windows 360 can also change to match the movement to the new data item.

Thus, the data items displayed within the graphical display areas 380 of the physical analog input device 310 can be synchronized to the data items shown in the selector 325 and rotational preview windows 360 of the visual user interface 320.

Figure 4:
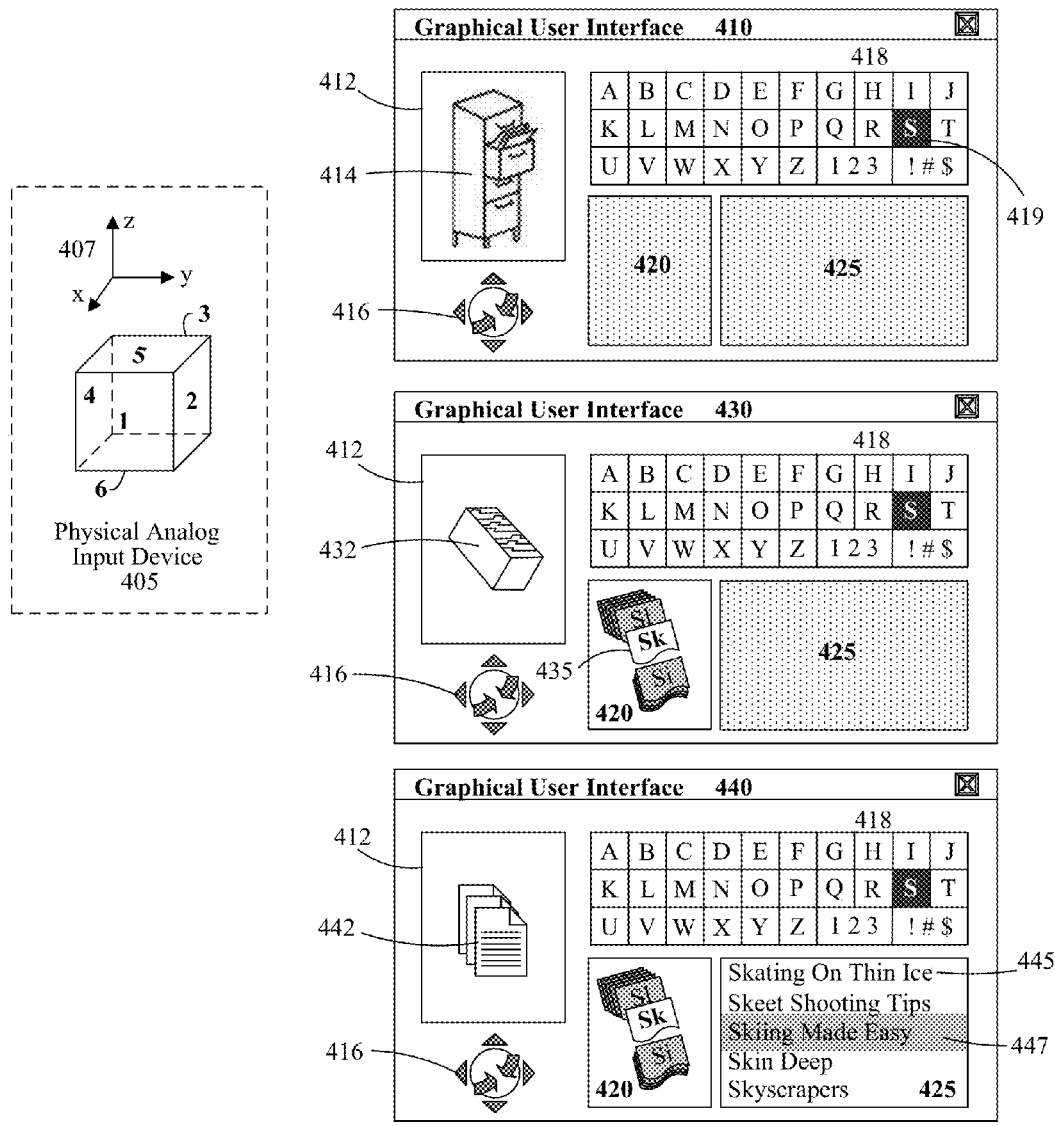
FIG. 4 is a collection of example graphical user interfaces (GUIs) for the three-dimensional data handling system illustrating navigation through a rotationally-dependent dataset by hyper-rotation of a physical analog input device in accordance with an embodiment of the inventive arrangements disclosed herein.

FIG. 4 is a collection 400 of example graphical user interfaces (GUIs) 410, 430, and 440 for the three-dimensional data handling system illustrating navigation through a rotationally-dependent dataset by hyper-rotation of a physical analog input device 405 in accordance with an embodiment of the inventive arrangements disclosed herein. The GUIs 410, 430, and 440 can be utilized in conjunction with method 100, system 200, and/or example embodiment 300.

The commands for the GUIs 410, 430, and 440 of the three-dimensional data handling system can be provided by the user via the physical analog input device 405. It can be assumed that the physical analog input device 405 is configured to communicate orientation data to the three-dimensional data handling system and that the user understands how to manipulate the physical analog input device 405 to navigate the rotationally-dependent dataset.

In this example, the physical analog input device 405 can be a cube having six distinct faces, numbered 1 through 6, and three Cartesian rotational axes 407 with four distinct faces, N, when rotated around each rotation axis 407. As the user rotates the physical analog input device 405 around an axis 407, some of the faces of the cube can change their orientation in three-dimensional space.

For example, by rotating the current presentation of the physical analog input device 405 around the X-axis 407, the positions of faces 1 and 3 can remain unchanged (i.e., face 1 is at the front and face 3 is to the rear) while the positions of faces 2 through 5 change places in the XY and XZ planes.

GUI 410 can illustrate the physical analog input device 405 being used to navigate a rotationally-dependent dataset representing an electronic filing system. The GUI 410 can include a display area 412 to render a digital object 414 representing the rotationally-dependent dataset, navigation controls 416, and data presentation areas 418, 420, and 425.

In GUI 410, the filing system can be represented as a filing cabinet digital object 414. The top level elements of the rotationally-dependent dataset, the alphabet, can be shown in a corresponding data presentation area 418. Since only the top level of the rotationally-dependent dataset is being navigated at this time, data presentation areas 420 and 425 can be inactive at this time.

In another contemplated embodiment, the data presentation areas 418, 420, and 425 can be consolidated into a single data presentation area where only the branch of the rotationally-dependent dataset that is currently being navigated through is presented.

Rotation of the physical analog input device 405 around a predefined axis 407 can control movement of a selector 419 through the data elements of the data presentation area 418. The rotation of the physical analog input device 405 can be mirrored by the digital object 414 or the digital object 414 can remain rotationally-static and present an animation like the drawers of the filing cabinet 414 opening and closing.

For example, as the physical analog input device 405 is rotated around the Z-axis 407, the filing cabinet 414 can spin accordingly and the selector 419 can move to the left or right, depending on whether the rotation is in the clockwise or counter-clockwise direction.

It should be noted that the physical analog input device 405 can be hyper-rotated through multiple revolutions around a rotational axis 407 in order to move the selector 419 through all of the data elements presented in data presentation area 418. That is, since the number of data elements, M=28, in the top-level of the example rotationally-dependent dataset is larger than the number of faces, N=4, the physical analog input device 405 has along a rotational axis 407, the user can continue rotation of the physical analog input device 405 through a maximum of seven revolutions, M divided by N, to continue movement of the selector 419.

The three-dimensional data handling system can track the number of revolutions performed and adjust movement through the data elements of the rotationally-dependent dataset accordingly. Further, the use of hyper-rotation of the physical analog input device 405 can apply to all rotational axes 407 and any branch of the rotationally-dependent dataset where M is greater than N.

The navigation controls 416 can be used to control the rotation/animation of the digital object 414 and movement of the selector 419 in situations where navigational commands are provided by a conventional computing input device instead of the physical analog input device 405.

GUI 430 can illustrate the information presented when the user selects a data element of the rotationally-dependent dataset in GUI 410; the letter 'S', in this example. Selection of a data element in the data presentation area 418 can be performed in a variety of ways commensurate with the specific embodiment of the three-dimensional data handling system and user interface.

For example, the physical analog input device 405 can include a selection button (not shown) that indicates the selection of the data element currently highlighted by the selector 419. Alternately, ceasing movement of the selector 419 and rotating the physical analog input device 405 around a different rotational axis 407 can also indicate that navigation through the rotationally-dependent dataset is to branch from the last data element upon which the selector 419 stopped.

That is, using the current example, if rotating the physical analog input device 405 around the Z-axis 407 scrolls the selector 419 through the alphabetical listing, stopping the Z-rotation on the letter 'S' and then rotating the physical analog input device 405 around the Y-axis 407 can access the next part or branch of the rotationally-dependent dataset that originates from the letter 'S', as illustrated in GUI 430. Since the rotationally-dependent dataset is a filing system, selection of the letter 'S' in GUI 410 can be thought of as selecting the filing cabinet drawer of the same letter.

Thus, in GUI 430, the digital object 414 of the filing cabinet can be replaced in the display area 412 with a digital object 432 of a file drawer, representing navigation to the 'S' branch of the rotationally-dependent dataset. Data presentation area 418 can remain unchanged within GUI 430 to remind the user of their navigation history and/or provide an easy means for the user to retrace their steps.

Data presentation area 420 can now become active to display to the user the data elements of the selected branch of the rotationally-dependent dataset; data presentation area 425 can remain inactive, since the user has not yet navigated to its corresponding level of the rotationally-dependent dataset. As shown in this example, rotation of the physical analog input device 405 around the Y-axis 407 can "flip" file cards 435 representing the alphabetical sub-groupings within the data presentation area 420. Again, selection of a data element in the data presentation area 420 can be performed in a variety of ways commensurate with the specific embodiment of the three-dimensional data handling system and user interface.

GUI 440 can illustrate the data presented when the user has navigated three-levels deep in a rotationally-dependent dataset. Using this example, the first or top level can be the alphabetical designation of a filing cabinet drawer. Selecting a drawer can navigate to the second level of filing cards having alphabetical sub-groupings of the selected alphabetical designation. Lastly, selection of a file card can present the user with file titles associated with the selected alphabetical sub-grouping, as shown in GUI 440.

In GUI 440, the digital object 432 of GUI 430 can be replaced with a digital object 442 representing the sub-level of the rotationally-dependent dataset that the user has accessed, file pages in this example. Data presentation areas 418 and 420 can remain unchanged within GUI 440 to remind the user of their navigation history and/or provide an easy means for the user to retrace their steps.

Data presentation area 425 can now present the data elements, file titles 445, of the rotationally-dependent dataset branch that the user has accessed. Since rotation of the physical analog input device 405 around the Z-axis 407 was used to control selection in data presentation area 418 and the Y-axis 407 for data presentation area 420, rotation of the physical analog input device 405 around the X-axis 407 can be used to control selector 447 with the data presentation area 425.

Selection of a file title 445 within the data presentation area 425 by the user can result in the presentation of additional data (not shown) about the file title 445, within a data presentation area 418, 420, or 425 of GUI 440 or within a secondary GUI window.

Additionally, GUIs 410, 430, and 440 can be configured to support multiple modes, as taught in U.S. Pat. No. 8,249,132 titled "ROTATIONALLY DEPENDENT INFORMATION IN A THREE DIMENSIONAL GRAPHICAL USER INTERFACE", where the rotation of the physical analog input device 405 accesses and presents different rotationally-dependent datasets based upon the selected mode.

Figure 5:
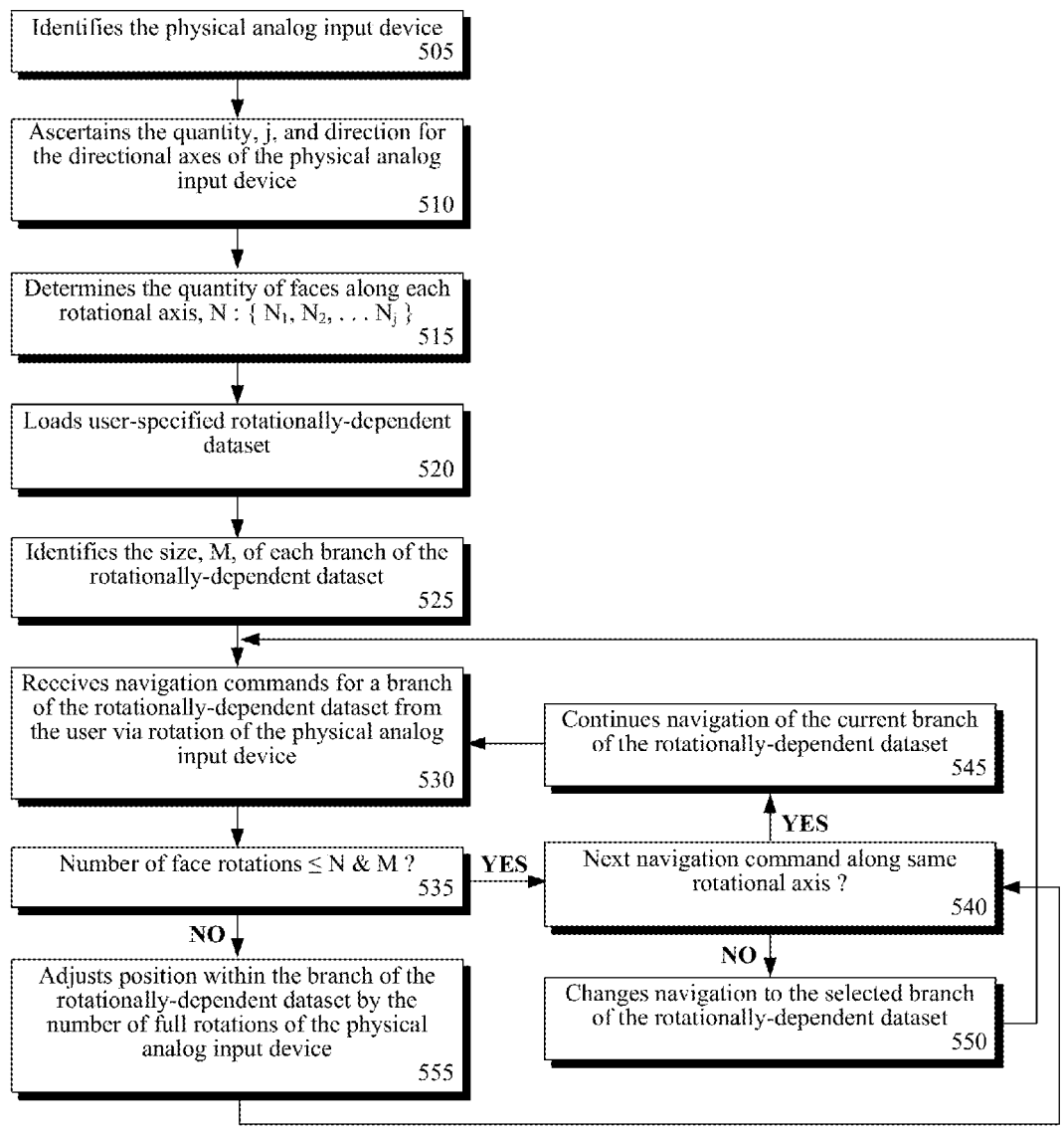
FIG. 5 is a flowchart of a method describing the handling of hyper-rotation of a physical analog input device by a three-dimensional data handling system to navigate a rotationally-dependent dataset in accordance with embodiments of the inventive arrangements disclosed herein.

FIG. 5 is a flowchart of a method 500 describing the handling of hyper-rotation of a physical analog input device by a three-dimensional data handling system to navigate a rotationally-dependent dataset in accordance with embodiments of the inventive arrangements disclosed herein. Method 500 can be performed within the context of method 100, system 200, example embodiment 300, and/or the GUIs 410, 430, and 440 of collection 400.

Method 500 can begin in step 505 where the three-dimensional data handling system can identify the physical analog input device. The quantity, j, and direction for the rotational axes of the physical analog input device can be ascertained in step 510.

In step 515, the quantity of faces, N, that the physical analog input device has along each rotational axis, the set $\{N_1, N_2, \ldots N_j\}$, can be determined. Alternately, the information determined by the three-dimensional data handling system can be supplied by the physical analog input device as part of step 505, when the physical analog input device identifies itself, or can be accessed from a static table containing such information for various physical analog input devices.

The user-specified rotationally-dependent dataset can be loaded in step 520. In step 525, the size, M, of each branch of the rotationally-dependent dataset can be identified. The three-dimensional data handling system can receive navigation commands for a branch of the rotationally-dependent dataset from the user via rotation of the physical analog input device in step 530.

In step 535, it can be determined if the number of face rotations is less than the quantity of faces, N, of the physical analog input device along the rotational axis and the quantity of data elements, M, in the branch of the rotationally-dependent dataset. When the number of face rotations is less than N and M, it can be determined if the next navigation command is along the same rotational axis in step 540.

When the following navigation command is along the same rotational axis, step 545 can be performed where navigation of the current branch of the rotationally-dependent dataset is continued. From step 545, method 500 can return to step 530 to continue processing the user's navigation commands.

When the following navigation command is not along the same rotational axis, navigation can be changed to the selected branch of the rotationally-dependent dataset in step 550. From step 550, method 500 can return to step 530 to continue processing the user's navigation commands.

When the number of face rotations is not less than N and M, corresponding to a situation where the physical analog input device is past at least one full revolution, the three-dimensional data handling system can adjust the position within the branch of the rotationally-dependent dataset by the number of full rotations of the physical analog input device in step 555. It should be noted that it can be assumed that navigation using the physical analog input device is only valid when then end of the branch of the rotationally-dependent dataset has not been met; hence, it can be implied that step 555 is not executed once the last data element of the branch has been accessed.

For example, using a cube having N=4, a branch of the rotationally-dependent dataset where M=9 and the number of face rotations is 6, the three-dimensional data handling system can move the selector to $M_6$ and recognize that the physical analog input device has made one full revolution along the rotational axis and that the second face is "active" or facing the user.

From step 555, method 500 can proceed to step 540 to determine how to handle the next received navigation command and continue processing subsequent navigation commands.

What is claimed is:

1. A method comprising:
   establishing a communications pathway between a data handling system and a physical input device, wherein the data handling system comprises one or more processors, one or more memories, and program instructions stored on at least one of the one or more memories, wherein at least one of the one or more processors execute the program instructions, wherein said physical input device is a physical object having N faces along an axis of rotation;
   presenting within a field of a graphical user interface a content item from an ordered dataset of content items of the data handling system, wherein a number of discrete items in the ordered dataset of content items is M, where M is greater than N;
   detecting rotations of the physical object along the axis of rotation, wherein each rotation of one of the N faces results in a navigation through the ordered dataset of content items; and
   responsive to each navigation through the ordered dataset of content items results in a corresponding presentation of the navigated to one of the content items within the field.

2. The method of claim 1, wherein presenting the rotationally-dependent dataset further comprises:
   rendering a digital object representing physical object within the graphical user interface, wherein the graphical user interface is presented on a computing device not physically coupled to the physical input device, which is a free moving object not directly physically tethered to any external device, wherein the graphical user interface shows the digital object rotating as the physical object rotates.

3. A method comprising:
detecting an initial face of a physical object having N faces along an axis of rotation, wherein the physical object is an input device for a human-to-machine interactions;
establishing a communications pathway between a data handling system and the input device, wherein the data handling system comprises one or more processors, one or more memories, and program instructions stored on at least one of the one or more memories, wherein at least one of the one or more processors execute the program instructions;
the data handling system accessing a data set of ordered content items, wherein M ordered content items exist in the data set, wherein a number of discrete items in the data set of content items is M, where M is greater than N;
the data handling system visually presenting an initial one of the ordered content items within a user interface of a display;
detecting the physical object being rotated along the axis of rotation so that X number of faces are cycled as the physical object is rotated from the initial face to a terminal face of the N faces;
in response to the detecting of the physical object being rotated, advancing the data set of ordered content items by X number of items to determine another one of the ordered content items; and
in response to advancing the data set, the data handling system visually presenting the another one of the ordered content items within the user interface in place of the initial one of the ordered content items.

4. The method of claim 3, wherein the physical object is a free moving object that is not physically coupled to the data handling system, wherein the physical object comprises at least one sensor to determine which of the faces of the N sided object is active, wherein the physical object wirelessly communicates with the data handling system, wherein the wireless communications comprise sending an indication from the at least one sensor to the data handling system.

5. The method of claim 3, wherein the physical object is a two or more sided object that is a free moving object, wherein each of the N faces corresponds to one side of the two or more sided object, wherein the physical object comprises at least one sensor to determine which of the faces of the two or more sided object is active, wherein each of the at least two sides of the physical object comprises a side-specific display area, wherein the display is one of the side-specific display areas, wherein the data handling system visually presents the another one of the ordered content lists within one of the side-specific display areas of the at least two sides of the physical object.

6. A device comprising:
a solid polyhedral shell having N faces along an axis of rotation, wherein N is two or more;
motion detection components configured to detect motion along predetermined directional axes of the polyhedral shell; and
a data handler configured to capture movement data from the motion detection components, wherein the data handler comprises one or more processors, one or more memories, and program instructions stored on at least one of the one or more memories, wherein at least one of the one or more processors execute the program instructions, wherein the data handler navigates through an ordered dataset of content items such that one ordered data item of the ordered dataset is active at any one time, wherein a number of discrete items in the ordered dataset of content items is M, wherein M is greater than N, wherein the captured movement data indicates the solid polyhedral shell being rotated along the axis of rotation so that X number of faces are cycled as the object is rotated from the initial face to a post-rotation face of the N faces, wherein in response to the solid polyhedral shell being rotated, the data handler sequentially advances the data set by X.

7. The device of claim 6, wherein the solid polyhedral shell further comprises:
at least one visual indicator configured to produce a visual signal in response to the motion of the solid polyhedral shell.

8. The device of claim 6, further comprising:
a speaker; and
an audio player providing electronic signals to the speaker, said audio player working in conjunction with the speaker being configured to play sounds in response to rotational motion of the solid polyhedral shell.

9. The device of claim 6, further comprising:
a wireless transceiver configured to wirelessly transmit the captured movement data to a remotely located data handling system not physically coupled to the solid polyhedral shell.

10. The device of claim 6, wherein the solid polyhedral shell further comprises:
a display area embedded within each face upon which data from a rotationally-dependent dataset is displayed.

11. The device of claim 6, further comprising:
a base module configured to allow placement of the solid polyhedral shell within a designated receptacle, wherein movement of the solid polyhedral shell is unhindered along the predetermined directional axes, wherein the base module facilitates conveyance of the captured movement data to the three-dimensional data handling system.

12. The device of claim 11, wherein the base module changes the predetermined directional axes that the solid polyhedral shell is capable of moving along.

13. The device of claim 6, wherein at least one selection mechanism is contained within at least one side of the solid polyhedral shell.

14. The method of claim 1, wherein the physical object is a free moving object that is not physically coupled to the data handling system, wherein the physical object comprises at least one sensor to determine which of the faces of the N sided object is upwardly facing, wherein the physical object wirelessly communicates with the data handling system, wherein the wireless communications comprise sending an indication from the at least one sensor to the data handling system.

15. The method of claim 1, wherein the physical object is a two or more sided object that is a free moving object, wherein each of the N faces corresponds to one side of the two or more sided object, wherein the physical object comprises at least one sensor to determine which of the faces of the two or more sided object is upwardly facing, wherein at least two sides of the physical object comprises a display area upon which data from a rotationally-dependent dataset is displayed, wherein a datum of the data displayed in the display area represents a navigated one of the content items of the ordered dataset.

16. The method of claim 15, wherein the physical object is a two or more sided object that is a free moving object, wherein each of the N faces corresponds to one side of the two or more sided object, wherein the physical object comprises at least one sensor to determine which of the faces of the two or more sided object is upwardly facing, wherein at least two sides of the physical object comprises a display area upon which data from a rotationally-dependent dataset is displayed, wherein a datum of the data displayed in the display area represents a navigated one of the content items of the ordered dataset.

17. A system comprising:
- a physical object having at least N faces along an axis of rotation and having an interior space, wherein N is two or more, wherein the physical object is a free moving object not directly physically tethered to any external device, wherein the entire physical object is rotated in space to visually expose different ones of the N faces to a visual vantage point of a human observer;
- motion detection components, which are physical components contained within the interior space, configured to detect motion along at least the axis of rotation of the physical object; and
- a data handler configured to capture movement data from the motion detection components, wherein the data handler comprises one or more processors, one or more memories, and program instructions stored on at least one of the one or more memories, wherein at least one of the one or more processors execute the program instructions, wherein the data handler navigates through an ordered dataset of content items such that one ordered data item of the ordered dataset is active at any one time, wherein a number of discrete items in the ordered dataset of content items is M, wherein M is greater than N, wherein the captured movement data indicates the physical object being rotated along the axis of rotation so that X number of faces are cycled as the object is rotated from the initial face to a post-rotation face of the N faces, wherein in response to the solid polyhedral shell being rotated, the data handler sequentially advances the data set by X.

18. The system of claim 17, wherein the physical object further comprises:
- N face-specific display areas, one of the N face-specific display areas corresponding to each of the N faces, wherein one of the N face-specific display areas corresponding to an visually exposed one of the different ones of the N faces to a vantage point of a human observer visually displays a currently active data item of the ordered data set as determined by the data handler.

19. The system of claim 17, further comprising:
- a speaker; and
- an audio player providing electronic signals to the speaker, said audio player working in conjunction with the speaker being configured to play sounds in response to rotational motion of the physical object.

20. The system of claim 17, further comprising:
- a wireless transceiver configured to wirelessly transmit the captured movement data to a remotely located data handling system not physically coupled to the physical object.

21. The system of claim 17, wherein the data handler is contained within the interior space.

* * * * *